April 14, 1959

G. H. HANNON 2,881,628

TRANSMISSION MECHANISM EMPLOYING PIVOTALLY MOUNTED
ROTATABLE DISK MEANS FOR CONTROLLING
SPEED VARIATIONS

Filed Aug. 6, 1954

INVENTOR.
Gilbert H. Hannon
BY
Warren F. B. Lindsley
ATTORNEY

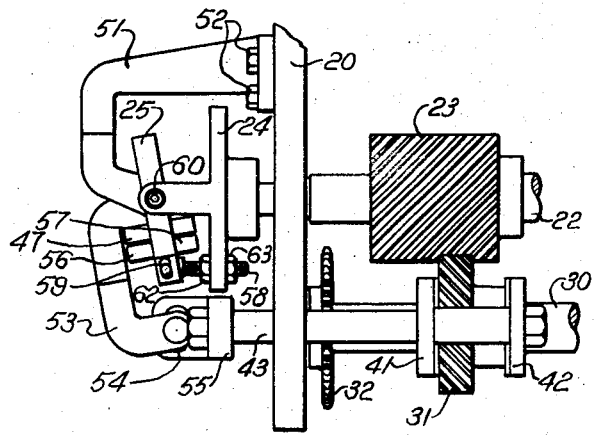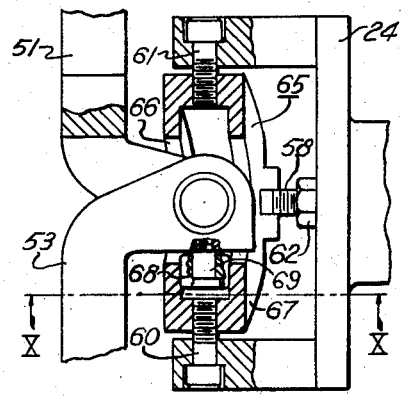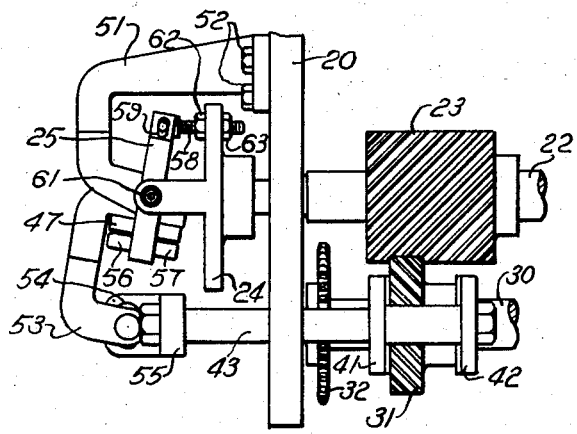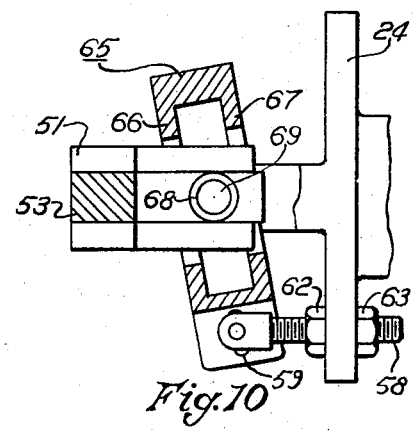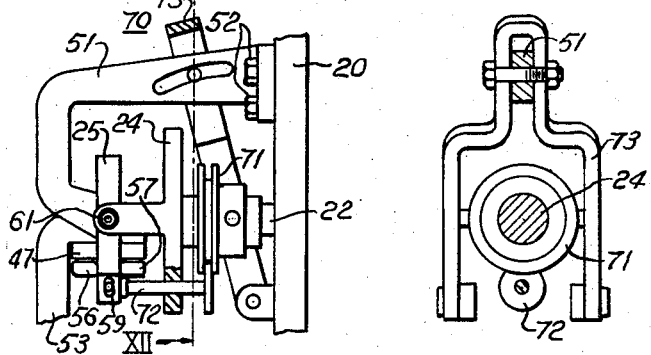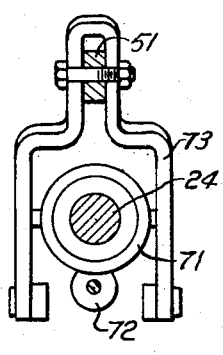

INVENTOR.
Gilbert H. Hannon
BY Warren F.B. Pindle
ATTORNEYS

United States Patent Office 2,881,628
Patented Apr. 14, 1959

2,881,628

TRANSMISSION MECHANISM EMPLOYING PIVOTALLY MOUNTED ROTATABLE DISK MEANS FOR CONTROLLING SPEED VARIATIONS

Gilbert H. Hannon, Green Bay, Wis., assignor, by mesne assignments, to H. G. Weber & Company, Inc., a corporation of Wisconsin Application August 6, 1954, Serial No. 448,241

17 Claims. (Cl. 74—393)

This invention relates to transmission mechanisms and more particularly to means utilizing a constant speed drive for obtaining an accurately controlled variable speed repetitive cycle of operation.

Although this mechanism is applicable to an unlimited variety of machinery, paper converting machinery such as automatic wrappers, bag or pouch making machines and paper sheeters will be particularly considered.

For example, transmission mechanisms heretofore known for use with automatic bag making machines were designed to cut one size bag without machine alterations, and other size bags could be formed by the machine only by a series of time consuming adjustments and part changes.

In paper converting machines employing either crimping or cutting operations or a combination of both, it is important that the linear velocity of the crimpers, cutter knife or both, and the anvil, correspond with the linear velocity of the paper during the time the crimpers, cutter knife or both, and the anvil are in engagement with the paper. During the remainder of the revolution of the crimper, cutter and anvil rollers, the rotating speed may vary. Thus, if the normal rotating speed of the crimper, cutter and anvil rollers is such that the normal linear velocity of any of the rollers is greater than the velocity of the paper, it is necessary to reduce the rotating speeds of that roller or rollers during the time that the crimping and cutting operations are being performed. If the normal rotating speed of the crimper, cutter and anvil rollers is such that the normal linear velocity of any of these rollers is less than the velocity of the paper, it is necessary to increase the rotating speed of that roller or rollers during the time that crimping or cutting operations are being performed.

Transmission mechanisms heretofore known in general required time consuming and expensive changes of machine parts in order to satisfy the above requirements. In order to satisfy the demands of industry for an unlimited variation in repeats or lengths of cutoff paper, many of the transmission mechanisms now employed merely approximate the paper speed during the time of crimping and cutting operations.

In accordance with the invention claimed, new and improved transmission mechanisms are provided which may be used with any machine requiring an accurately controlled variable speed repetitive cycle of operation. The particular automatic transmission mechanisms disclosed result in rapid changeover and high operating speeds in producing a large variety of articles such as pouches or bags. The size of these articles may be varied over a considerable range by a simple rapid adjustment of the transmission mechanism with extreme accuracy such as is required in the cutting of modern pliable paper or plastic materials.

This new and improved transmission mechanism may comprise a drive shaft, a driven shaft, a first gear rotatably mounted on the drive shaft and a second gear slidably mounted on the driven shaft and rotatable therewith in meshing engagement with the first gear. Means are provided for actuating the second gear longitudinally of the driven shaft comprising a disk pivotally mounted at diametrically disposed points on the disk to the drive shaft for rotation therewith. The disk is arranged for pivotal movement from a position normal to the axis of movement of the drive shaft to an angular position inclined to the axis of movement of the drive shaft. Adjustable means are provided for fixing the disk in any of a plurality of predetermined angular positions. A pivotally mounted lever arm is arranged at one end thereof to follow linearly the plane of rotation of the disk as it rotates with the drive shaft and arranged at the other end thereof to actuate the second gear linearly along the driven shaft. The drive shaft may be driven at a constant speed and the driven shaft may be connected to any operating mechanism such as, for example, a crimper, cutter and anvil roller of a bag making machine requiring an accurately controlled variable speed repetitive cycle of operation.

It is, therefore, one object of the present invention to provide a new and improved transmission mechanism for use in equipment in which an accurately controlled variable speed repetitive cycle of operation is required from a constant speed source of power.

Another object of this invention is to provide a new and improved transmission mechanism in which the requisite adjustments for different repetitive cycles of operation can be accurately made with the minimum of attention and labor.

A further object of this invention is to provide a new and improved transmission mechanism for paper converting machines which can be adjusted for different size repeats during operation of the transmission mechanism or machine.

A still further object of this machine is to provide a new and improved transmission mechanism which is simple, durable and economical in construction and operation.

A still further object of this machine is to provide a new and improved transmission mechanism in which the time of linear travel of a reciprocating gear is fixed for a given mechanism setting regardless of the length of linear travel of the reciprocating gear.

Other objects and advantages of this invention will become apparent from the following description when read in connection with the accompanying drawings, in which:

Fig. 7 is a side elevational view of the structure shown in Fig. 1 showing the control disk set at an angle and the driven gear at one end of its path of movement;

Fig. 8 is a side view similar to Fig. 7 with the driven gear at the opposite end of its path of movement;

Fig. 9 is an enlarged view of a modification of the control disk and operating mechanism of the transmission mechanism shown in Fig. 1 and illustrates a single roller and double ring in place of the double rollers and single ring of Fig. 1 and embodying the present invention;

Fig. 10 is a view in horizontal cross section taken along the line X—X of Fig. 9;

Fig. 11 is a further modification of the control disk and operating mechanism of the transmission mechanism shown in Fig. 1 and illustrating a shipper sleeve and lever for adjusting the angle of the disk while operating the transmission mechanism;

Fig. 12 is a view in vertical cross section taken along the line XII—XII of Fig. 11;

Figure 1:
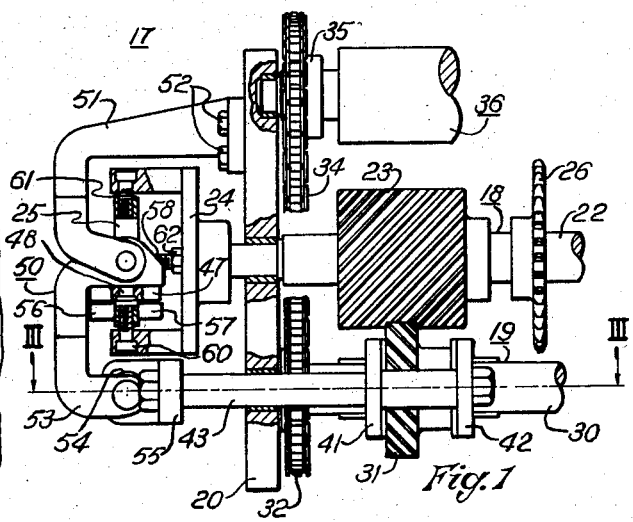
Fig. 1 is a side view partly in elevation of the transmission mechanism embodying the various features of the present invention.
Figure 3:
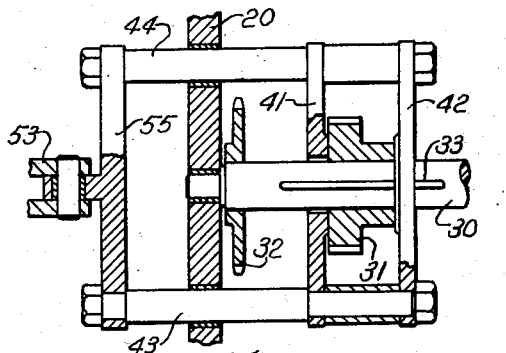
Fig. 3 is a horizontal cross sectional view taken along the line III—III of Fig. 1 illustrating the shaft along which the reciprocating gear is actuated.
Figure 15:
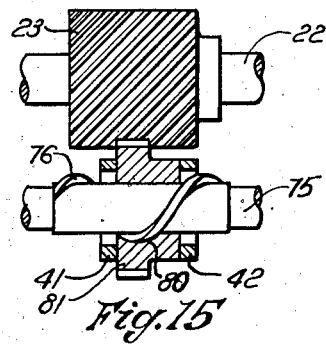
Figure 13:
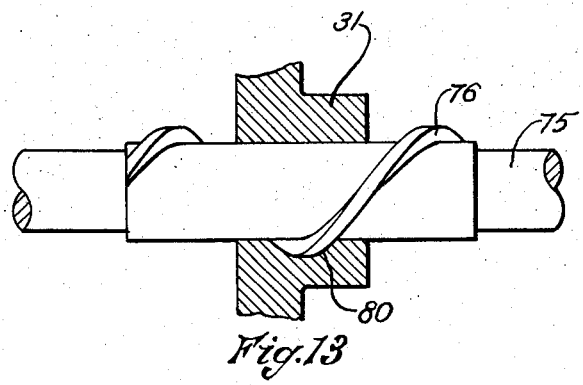
Fig. 13 is an enlarged view of a modification of the driven member shown in Figs. 1 and 3 illustrating a spiral thread formed on and extending from the outer periphery of the driven shaft and in engagement with a spiral groove cut in the inner walls of the bore extending through the reciprocating gear.
Figure 16:
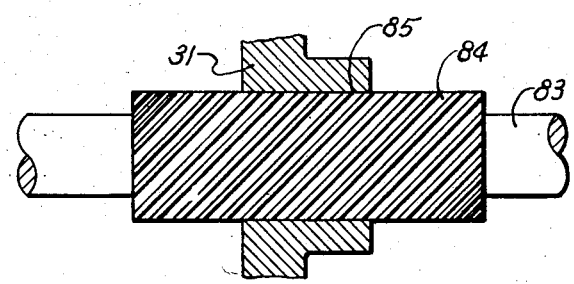

Fig. 15 is a view of the driven shaft shown in Fig. 13 showing the spiral thread inserted in a cooperating groove formed in one of two mating helical gears; and Fig. 16 is a further modification of the driven member shown in Figs. 1, 3 and 13 illustrating a helical gear cut in the outer periphery of the driven shaft in meshing engagement with internal helical gear teeth formed in the inner walls of a bore extending through the reciprocating gear.

Figure 2:
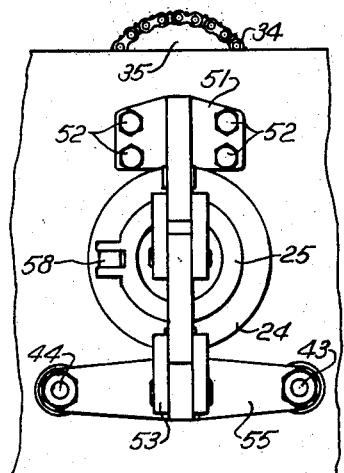
Fig. 2 is an end view of Fig. 1.

Referring more particularly to the drawings by characters of reference, Figs. 1, 2 and 3 illustrate a transmission mechanism 17 comprising a first rotary unit 18 arranged adjacent a second rotary unit 19 mounted within a housing or framework 20.

The first rotary unit 18 comprises a drive member or shaft 22, a helical gear 23 secured to shaft 22 for rotation therewith, a hub or collar 24 secured at one end of shaft 22 for rotation therewith, a control ring or disk 25 pivotally mounted at diametrically disposed points on disk 25 to the collar 24 and in turn shaft 22 for rotation therewith, and a sprocket wheel 26 arranged at the other end of shaft 22 for rotation therewith. Shaft 22 is actuated by any suitable source of power, for example, a constant speed electric motor through an endless chain conveyor (not shown) connected to suitable sprocket wheels including sprocket wheel 26. Disk 25 is arranged for pivotal movement from a position normal to the axis of rotation of shaft 22 to an angular position inclined to the axis of rotation of shaft 22.

The second rotary unit 19 comprises a driven member or shaft 30 which, for example, may be spaced from and parallelly arranged with shaft 22, a helical gear 31 slidably mounted on shaft 30 in rotating meshing engagement with helical gear 23, and a sprocket wheel 32 mounted on one end of shaft 30. Gear 31 is arranged for movement longitudinally of shaft 30. An external keyway 33 shown in shaft 30 (Fig. 3) is used for engagement with a driving key in engagement with a mating keyway in helical gear 31. The sprocket wheel 32 is connected through an endless chain 34, and sprocket wheel 35 of a third rotary unit 36.

Figure 6:
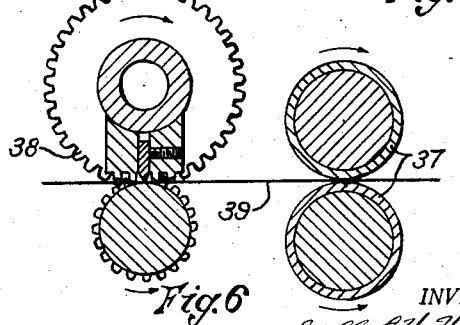
Fig. 6 is a diagrammatic view of one type of mechanism to be driven by the transmission mechanism of Figs. 1 to 5 illustrating feed rollers and a cutting and sealing head with a web of paper or film passing therebetween.

The third rotary unit 36 mounted in framework 20 may comprise a machine forming member of, for example, an automatic bag or pouch making machine. Unit 36 may actuate crimper, cutter knife and anvil rollers. As shown in Fig. 6 this transmission mechanism may be the controlling and driving mechanism for the feed rollers 37 and crimping, cutting and sealing head 38 shown with a web of paper or film 39 passing therebetween.

The path of travel of gear 31 longitudinally of shaft 30 is controlled by collars 41 and 42 mounted on a pair of reciprocating rods 43 and 44 suitably mounted in bearings of framework 20 for longitudinal movement therein. Rods 43 and 44 are arranged parallel to shaft 30 on opposite sides thereof. Collars 41 and 42 are secured to and arranged to extend between rods 43 and 44.

The force for actuating gear 31 along shaft 30 is obtained from revolving disk 25 through a connecting means 50. Means 50 comprises a C-shaped lever or extension arm 51 secured at one end thereof to framework 20 by bolts 52 and supporting at the other end thereof a pivotally mounted C-shaped lever or extension arm 53. The pivotally mounted lever arm 53 is arranged at one end thereof to be reciprocated to follow the plane of rotation of disk 25 as it rotates with drive shaft 22 and arranged at the other end to actuate gear 31 linearly along drive shaft 30. Arm 53 is pivotally mounted at one end thereof to extension arm 51 and at the other end thereof in a lost motion connection 54 to a connecting rod 55. Connecting rod 55 is rigidly secured to rods 43 and 44 at their ends opposite collars 42 and is used in this application as a push-pull rod connection. The C-shaped lever or connecting arm 53 comprises a pair of rollers 56 and 57 mounted at one end thereof to engage the plane surfaces of disk 25.

Figure 4:
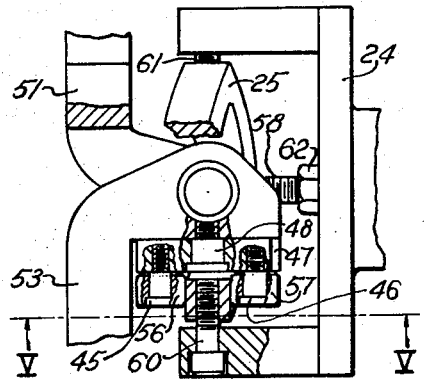
Fig. 4 is an enlarged detail view partly in section of the control disk illustrated in Fig. 1 with the control disk in an angular position.

As more clearly shown in Fig. 4, rollers 56 and 57 are rotatably mounted on bolts 45 and 46 respectively, which are threaded into a rotatably mounted spacing block 47. Block 47 is in turn rotatably mounted on a bolt 48 which is threaded into the C-shaped lever or extension arm 53. Rollers 56 and 57 and block 47 are rotatable about the longitudinal axis of their respective fastening bolts. As disk 25 is rotated about its trunnions 60 and 61 the sides of disk 25 will apply a torque to rollers 56 and 57 which in turn will rotate block 47 about the longitudinal axis of bolt 48, thereby positioning the axes of rotation of rollers 56 and 57 parallel to the plane of rotation of disk 25 regardless of the angular position of disk 25.

Disk 25 as more clearly shown in Fig. 4 is secured to extension arms of collar 24 for rotation therewith by means of trunnions 60 and 61. These trunnions may be loosely mounted in bearing openings in the extension arms of hub or collar 24 or in any suitable retaining ring to provide for pivotal or rotary movement of disk 25 from a position substantially normal to the axis of rotation of drive shaft 22 to an angular position inclined to the axis of rotation of shaft 22.

Figure 5:
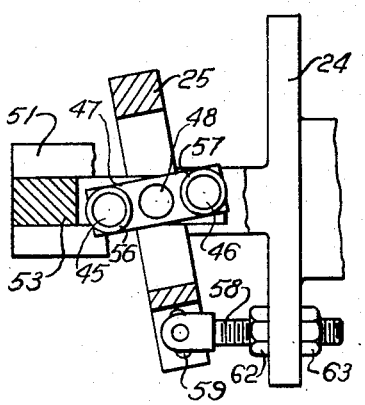
Fig. 5 is a view in horizontal cross section taken along the line V—V of Fig. 4.

Fig. 5 illustrates one adjustable means for fastening disk 25 in any of a plurality of predetermined angular positions. This adjustable means comprises a threaded bolt 58 pivotally connected to disk 25 in a lost motion connection 59 at a point along the circumference thereof and fastened to hub or collar 24 by a pair of nuts 62, 63, as shown. Thus disk 25 will retain its angular position when rotated with collar 24 and shaft 22.

Upon rotation of shaft 22 collar 24 and disk 25 will rotate therewith. If disk 25 is secured in a predetermined angular position its parallel sides will define parallel plane surfaces of revolution inclined to the axis of rotation of shaft 22. The sides of disk 25 will oscillate back and forth the C-shaped extension arm 53 through an arcuate path and the end of arm 53 connected to rods 43 and 44 will linearly reciprocate rods 43 and 44 through a given path. The linear reciprocation of rods 43 and 44 will actuate helical gear 31 linearly along helical gear 23 upon rotation of gear 23.

Figs. 7 and 8 illustrate the transmission mechanism 17 with its control disk 25 and pivotally mounted extension arm 53 in two extreme positions for a given angular position of disk 25.

Figs. 9 and 10 illustrate a modification of the disk and oscillating C-shaped extension arm of Figs. 1 to 8 wherein a disk 65 is pivotally mounted to collar 24 by trunnions 60 and 61 as heretofore described. Disk 65 comprises a pair of spaced rings 66 and 67 parallelly arranged and connected at their outer peripheries by a common collar or rim member. The C-shaped extension arm 53 is provided with a single roller 68 mounted at the pivoted end thereof and arranged to engage the inner adjacent sides of rings 66 and 67 of disk 65. Roller 68 is rotatably mounted on a bolt 69 which is suitably threaded into C-shaped lever or extension arm 53. Roller 68 alternately engages the juxtapositioned sides of rings 66 and 67 and rolls or slides over one or both of these surfaces upon rotation of disk 65. Roller 68 reciprocates linearly with C-shaped arm 53 upon rotation of disk 25.

Figs. 11 and 12 illustrate the transmission mechanism of Figs. 1 to 8 wherein the shaft 22 is lengthened to accommodate a shipper sleeve and leverage device 70 to provide for adjustment of the angle of disk 25 during rotation of shaft 22. Device 70 comprises a hub 71 rotatably mounted on shaft 22 and arranged for movement longitudinally thereof by a push rod 72, loosely mounted in an aperture in the outer periphery of disk 25. A lever arm 73 is pivotally mounted on framework 20 and may be used manually or automatically to actuate hub 71 longitudinally along shaft 22 to position disk 25 in any one of an infinite number of angular positions during actuation of the transmission mechanism, particularly during rotation of shaft 22, or shaft 30, or both.

Fig. 13 illustrates a modification of the driven member 19 shown in Figs. 1 to 3 and comprises a driven shaft 75 provided with a spiral thread 76 formed on and extending from the outer periphery of shaft 75. The reciprocating helical gear 31 has provided in the walls of the bore extending therethrough a spiral groove 80 in meshing engagement with spiral thread 76. The variation in rotative speed of the driven shaft is generated by the spiral in a manner known in the art.

Figure 14:
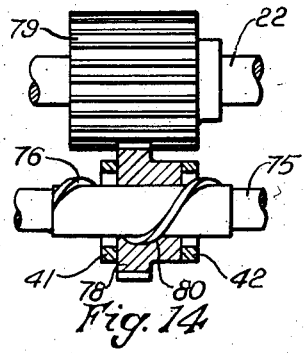
Fig. 14 is a view of the driven shaft shown in Fig. 13 showing the spiral thread inserted in a cooperating groove formed in one of two mating spur gears.

Fig. 14 illustrates the driven shaft 75 of Fig. 13 in combination with a pair of spur gears 78, 79. The spiral thread 76 of shaft 75 cooperates with a spiral groove 80 formed in the walls of a bore extending axially through spur gear 78. Spur gear 78 is in meshing engagement with spur gear 79. Upon actuation of collars 41 and 42 by disk 25, spur gear 78 will be actuated linearly along shaft 75 while rotating in meshing engagement with the spur gear 79 mounted on drive shaft 22.

Fig. 15 illustrates the driven shaft 75 shown in Fig. 14 in combination with helical gears 81 and 23. The spiral thread 76 of shaft 75 cooperates with a spiral groove 80 formed in the walls of a bore extending axially through helical gear 81. The helical teeth of gear 81 formed in the outer periphery thereof are in meshing engagement with the helical teeth formed in the outer periphery of gear 23 mounted on drive shaft 22.

Fig. 16 illustrates a modification of the driven member 19 shown in Fig. 1 and comprises a driven shaft 83 provided with helical gear teeth 84 formed in the outer periphery thereof. The helical gear teeth 84 are arranged in meshing engagement with helical teeth 85 formed in the walls of a bore extending axially through the reciprocating gear 31. Gear 31 is actuated linearly along shaft 83 by collars 41 and 42, in the same manner as the structure described in Fig. 1.

Figs. 13 to 16 disclose a number of threaded shafts, spur and helical gear combinations which may be used with the invention in a large variety of automatic machine applications.

Referring now to Fig. 1, if drive shaft 22 is rotated at a constant speed helical gear 23 will rotate meshing helical gear 31 and driven shaft 30. Driven shaft 30 in turn will drive the rotary unit 35 to perform useful work. If disk 25 is in a position substantially normal to the longitudinal axis of shaft 22 driven shaft 30 and rotary unit 35 will rotate at a constant speed. If disk 25 is fixed in an angular position with reference to the longitudinal axis of shaft 22 helical gear 31 will be reciprocated linearly along helical gear 23. As known in the art, if gears 23 and 31 are helical gears and shaft 30 travels longitudinally back and forth along shaft 30 while in meshing engagement with gear 23 the rate of rotation of shaft 30 will be slower than the rotation of shaft 23 during the movement of gear 31 across gear 22 in one direction, but when gear 31 moves linearly in the opposite direction along its shaft 30 there is a sharp increase in the rotating speed of shaft 30 in spite of the fact that at all times gear 23 rotates at a constant speed.

The linear travel of gear 31 along shaft 30 is depended upon the angular position of disk 25 on shaft 22. If the angle made between the normal to the axis of shaft 22 and disk 25 is small the linear travel of gear 31 along gear 23 will be relatively small, and the speed variation of gear 31 will be relatively small. If the angle made between the normal to the axis of shaft 22 and disk 25 is large the linear travel of gear 31 along gear 23 will be relatively large, and the speed variation of gear 31 will be relatively large. Thus, the velocity of operation of the speed-up and slow-down of driven shaft 30 may be very simply controlled by the particular angular position of disk 25. The time for each cycle of forward and reverse movements of gear 31 for a given machine setting is always the same.

It is, of course, important in many machine operations that the linear velocity of one tool correspond with the linear velocity of another device during part of an automatic operation but during the remainder of the cycle of operation the tool and device may operate at any desired speed. In automatic bag making machines the linear velocity of the crimper and cutter knife and anvil must correspond with the linear velocity of paper during the time the crimpers and cutting knife and anvil are in engagement with the paper. During the remainder of the revolutions of the cutter and anvil rollers respectively, the rotating speed may vary. Most present mechanisms approximate paper speed only due to the fact that they are not adjustable and depend upon fixed change parts.

In accordance with the present invention a new and improved transmission mechanism is provided which utilizes the time between crimping or cutting operations, for example, in a bag making machine to rapidly accelerate the paper to form large size bags or to decrease the speed of movement of the paper to make small size bags. Heretofore, the transmission mechanisms used to vary the length of operation of each repetitive cycle of operation was accomplished by changing gears or by making a series of linkage and gear adjustments usually consuming an unreasonable length of time. Further, these adjustments were usually a hit and miss proposition where the operator had to make a series of test runs before a given size bag or pouch could be manufactured. Still further, it was difficult to repeat a given bag size manufacturing operation after a series of size adjustments and obtain a bag of a size identical with the size of a bag previously manufactured.

The invention disclosed herein provides for a simple adjustment of the angular position of disk 25 to provide for a given bag or pouch size. Other sizes of pouches may be manufactured by merely changing feed roll gears and by changing the angular position of the disk 25 while the machine is shut down or running.

As shown in the drawings, the lever arm 53 has at least one roller in sliding or rolling engagement with disk 25 for actuation by disk 25 linearly along a given path. The drawings illustrate arrangements wherein the roller engages the outside plane surface of disk 25 or the inside juxtapositioned surfaces of the rings 66 and 67 forming disk 65. It is, however, within the scope of this invention to cover by the claims a structure which utilizes a means which may follow the movement of the surface of rotation of disks such as disks 25 or 65 but having no physical contact therewith. Further, it is within the scope of this invention to utilize structure which may have a roller connected to an extension or lever arm which rolls over any surface of the disks 25 and 65 such as the outer periphery of the rim or disk 65.

The shafts 22 and 30 shown in the drawings are parallelly arranged but it is within the knowledge of one skilled in the art to arrange these shafts in any arrangement depending on the type of gears used.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A transmission mechanism comprising a drive member, a driven member, a gear fixed for rotation with said driven member and arranged for movement longitudinally of said driven member, and means for actuating said gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to follow the plane of rotation of said disk as it rotates with said drive member and arranged at the other end thereof to actuate said gear linearly along said driven member.

2. A transmission mechanism comprising a drive member, a driven member, a first gear fixed for rotation with said drive member, a second gear fixed for rotation with said driven member, said second gear arranged for movement longitudinally of said driven member into meshing engagement with said first gear, and means for actuating said second gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to follow the plane of rotation of said disk as it rotates with said drive member and arranged at the other end thereof to actuate said second gear linearly along said driven member.

3. A transmission mechanism comprising a drive member, a driven member, a first gear fixed for rotation with said drive member, a second gear fixed for rotation with said driven member and disposed in meshing engagement with said first gear, said second gear arranged for movement longitudinally of said driven member, and means for actuating said second gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to follow the plane of rotation of said disk as it rotates with said drive member and arranged at the other end thereof to actuate said second gear linearly along said driven member.

4. A transmission mechanism comprising a drive member, a driven member, a first helical gear fixed for rotation with said drive member, a second helical gear fixed for rotation with said driven member and disposed in meshing engagement with said first gear, said second gear arranged for movement longitudinally of said driven member, and means for actuating said second gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to follow the plane of rotation of said disk as it rotates with said drive member and arranged at the other end thereof to actuate said second gear linearly along said driven member.

5. A transmission mechanism comprising a drive member, a driven member, a first helical gear fixed for rotation with said drive member, a second helical gear fixed for rotation with said driven member and disposed in meshing engagement with said first gear, said second gear arranged for movement longitudinally of said driven member, and means for actuating said second gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to be reciprocated by said disk as it rotates with said drive member and arranged at the other end thereof to actuate said second gear linearly along said driven member.

6. A transmission mechanism comprising a drive member, a driven member, a first helical gear fixed for rotation with said drive member, a second helical gear fixed for rotation with said driven member and disposed in meshing engagement at all times with said first gear, said second gear arranged for movement longitudinally of said driven member, and means for actuating said second gear longitudinally of said driven member comprising a disk pivotally mounted at diametrically disposed points on said disk to said drive member for rotation therewith, said disk being arranged for pivotal movement from a position normal to the axis of movement of said drive member to an angular position inclined to said axis of movement of said drive member, adjustable means for fixing said disk in one of a plurality of predetermined angular positions, and a pivotally mounted lever arm arranged at one end thereof to follow substantially linearly the plane of rotation of said disk as it rotates with said drive member and arranged at the other end thereof to reciprocate said second gear linearly along said driven member of said first gear.

7. A transmission mechanism comprising a drive shaft, a driven shaft arranged substantially parallel with said drive shaft, a first helical gear fixed for rotation with said drive shaft, a second helical gear fixed for rotation with said driven shaft and disposed in meshing engagement at all times with said first gear, said second gear arranged for movement longitudinally of said driven shaft, and means for actuating said second gear longitudinally of said driven shaft comprising a disk pivotally mounted at diametrically disposed points on said disk to said drive shaft for rotation therewith, said disk being arranged for pivotal movement from a position normal to the axis of movement of said drive shaft to an angular position inclined to said axis of movement of said drive shaft, adjustable means for fixing said disk in one of a plurality of predetermined angular positions, and a pivotally mounted lever arm arranged at one end thereof to follow substantially linearly the plane of rotation of said disk as it rotates with said drive shaft and arranged at the other end thereof to reciprocate said second gear linearly along said driven shaft and said first gear.

8. A transmission mechanism comprising a drive shaft, a driven shaft, a gear fixed for rotation with said driven shaft and arranged for movement longitudinally of said driven shaft, and means for actuating said gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in one of a predetermined number of angular positions, and a lever arm pivotally mounted at a point between the ends thereof and arranged at one end to be reciprocated by the plane surface of said disk as it rotates with said drive shaft and arranged at the other end to reciprocate linearly said gear along said driven shaft.

9. A transmission mechanism comprising a drive shaft, a driven shaft, a first helical gear fixed for rotation with said drive shaft, a second helical gear fixed for rotation with said driven shaft and disposed in meshing engagement with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in one of a predetermined number of angular positions, and a lever arm pivotally mounted at a point between the ends thereof and arranged at one end to be reciprocated by said disk as it rotates with said drive shaft and arranged at the other end to reciprocate linearly said second gear along said driven shaft whereby the rate of rotation of said second gear and said driven shaft is variable while said first gear and said drive shaft rotate at a constant speed.

10. A transmission mechanism comprising a drive shaft, a driven shaft, a first gear fixed for rotation with said drive shaft, a second gear fixed for rotation with said driven shaft and disposed in meshing engagement with said first gear, said second gear arranged for movement longitudinally of said driven shaft, and means for actuating said second gear longitudinally of said driven shaft comprising a ring, a pair of diametrically disposed trunnions provided on the circumference of said ring, means for pivotally connecting said trunnions to said drive member for rotary movement therewith and to provide for movement of said ring from a position substantially normal to the axis of movement of said drive shaft to an angular position inclined to the axis of movement of said drive shaft, adjustable means for fixing said ring in one of a predetermined number of angular positions, and a lever arm pivotally mounted at a point between the ends thereof and arranged at one end to follow linearly the plane of rotation of the surface of said ring as it rotates with said drive shaft and arranged at the other end to reciprocate linearly said second gear along said driven shaft.

11. A transmission mechanism comprising a drive shaft, a driven shaft, a first helical gear fixed for rotation with said drive shaft, a second helical gear fixed for rotation with said driven shaft and disposed in meshing engagement with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in one of a predetermined number of angular positions, and a lever arm pivotally mounted at a point between the ends thereof and arranged at one end to follow substantially linearly the plane of rotation of the surface of said disk as it rotates with said drive shaft and arranged at the other end to reciprocate linearly said second gear along said driven shaft whereby the rate of rotation of said second gear and said driven shaft is variable while said first gear and said drive shaft rotate at a constant speed.

12. A transmission mechanism comprising a drive shaft, a driven shaft arranged substantially parallel with said drive shaft, a first helical gear fixed for rotation with said drive shaft, a second helical gear fixed for rotation with said driven shaft and disposed in meshing engagement at all times with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive member for rotary movement therewith and to provide for movement of said disk from a position substantially normal to the axis of movement of said drive shaft to an angular position inclined to the axis of movement of said drive shaft, adjustable means for fixing said disk in one of a predetermined number of angular positions, and a lever arm pivotally mounted at a point between the ends thereof and arranged at one end to be reciprocated by the plane surface of said disk as it rotates with said drive shaft and arranged at the other end to reciprocate linearly said second gear along said driven shaft whereby the rate of rotation of said second gear and said driven shaft is variable while said first gear and said drive shaft rotate at a constant speed.

13. A transmission mechanism comprising a drive shaft, a driven shaft, a first helical gear fixed for rotation with said drive shaft, a second helical gear fixed for rotation with said driven shaft and disposed in meshing engagement with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in a predetermined number of angular positions, and a lever arm pivotally mounted at a point between the ends thereof and comprising a roller mounted at one end thereof to engage a plane surface of said disk, said roller and said lever arm being actuated linearly by the rotation of the plane surface of said disk as said disk rotates with said drive shaft, said lever arm being arranged at the other end to reciprocate linearly said second gear along said driven shaft whereby the rate of rotation of said second gear and said driven shaft is variable while said first gear and said drive shaft rotate at a constant speed.

14. A transmission mechanism comprising a drive shaft, a driven shaft, a first helical gear fixed for rotation with said drive shaft, a second helical gear fixed for rotation with said driven shaft and disposed in meshing engagement with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in a predetermined number of angular positions, and a lever arm pivotally mounted at a point between the ends thereof and comprising a pair of rollers mounted at one end thereof and arranged to engage parallel plane surfaces of said disk, said rollers and said lever arm being actuated linearly by the rotation of said disk as said disk rotates with said drive shaft, said lever arm being arranged at the other end to reciprocate linearly said second gear along said driven shaft whereby the rate of rotation of said second gear and driven shaft is variable while said first gear and said drive shaft rotate at a constant speed.

15. A transmission mechanism comprising a drive shaft, a driven shaft, a first gear fixed for rotation with said drive shaft, a second gear fixed for rotation with said driven shaft and arranged for movement longitudinally of said driven shaft, means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, means for placing said disk in a predetermined angular position, a lever arm pivotally mounted at a point between the ends thereof and arranged at one end to be reciprocated by the plane surface of said disk as it rotates with said drive shaft and arranged at the other end to reciprocate linearly said second gear along said driven shaft, and means for changing the position of said disk during rotation of at least one of said shafts.

16. A transmission mechanism comprising a drive shaft, a driven shaft, a first gear fixed for rotation with said drive shaft, a second gear fixed for rotation with said driven shaft and arranged for movement longitudinally of said driven shaft, means for actuating said second gear longitudinally of said driven shaft comprising a disk, a pair of diametrically disposed trunnions provided on the cricumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, a shipper sleeve for placing said disk in a predetermined angular position, a lever arm pivotally mounted at a point between the ends thereof and comprising a roller mounted at one end thereof to engage the plane surface of rotation of said disk, said roller of said lever arm being actuated linearly by the rotation of the plane surface of said disk as said disk rotates with said drive shaft, and means for actuating said disk into another predetermined angular position during rotation of said driven shaft.

17. A transmission mechanism comprising a drive shaft, a driven shaft, a first helical gear fixed for rotation with said drive shaft, a second helical gear fixed for rotation with said driven shaft and disposed in meshing engagement with said first gear, said second gear arranged for movement longitudinally of said driven shaft, and means for actuating said second gear longitudinally of said driven shaft comprising a disk, a pair of diametrically disposed trunnions provided on the circumference of said disk, means for pivotally connecting said trunnions to said drive shaft for rotary movement therewith and to provide for movement of said disk from a position substantially normal to the axis of movement of said drive shaft to an angular position inclined to the axis of movement of said drive shaft, adjustable means for fixing said disk in a predetermined number of angular positions, a lever arm pivotally mounted at a point between the ends thereof, means comprising a spacing block rotatably mounted on said lever arm at one end thereof about an axis substantially parallel to the plane surface of said disk, and a pair of spaced rollers rotatably mounted on said block for rotation about axes substantially parallel to said axis of said block, said block being rotated upon rotation of said disk thereby keeping said rollers in engagement with the plane surfaces of said disk, said rollers and said lever arm being actuated linearly by the rotation of the plane surface of said disk as said disk rotates with said drive shaft, said lever arm being arranged at the other end to reciprocate linearly said second gear along said driven shaft.

References Cited in the file of this patent
UNITED STATES PATENTS

| | | |
|---|---|---|
| 767,593 | Patchers | Aug. 16, 1904 |
| 1,012,851 | Hodgkinson | Dec. 26, 1911 |
| 1,087,558 | Sears | Feb. 17, 1914 |
| 1,193,728 | Staude | Aug. 8, 1916 |
| 1,234,771 | Kiewicz | July 31, 1917 |
| 1,676,859 | Gee | July 10, 1928 |
| 2,307,214 | Gollmer | Jan. 5, 1943 |
| 2,546,282 | Warren | Mar. 27, 1951 |
| 2,577,675 | Burkland | Dec. 4, 1951 |